United States Patent
Anderson et al.

[15] 3,662,199
[45] May 9, 1972

[54] HIGH VOLTAGE INSULATED COIL AND MACHINE UTILIZING THE SAME

[72] Inventors: Robert L. Anderson, Bay Village; Marvin M. Fromm, Cleveland Heights, both of Ohio

[73] Assignee: Portec, Inc., Cleveland, Ohio

[22] Filed: Mar. 1, 1971

[21] Appl. No.: 119,571

[52] U.S. Cl. .................................................310/208, 336/209
[51] Int. Cl. .................................................H02k 3/32
[58] Field of Search .................................310/208; 336/209

[56] References Cited

UNITED STATES PATENTS

| | | | |
|---|---|---|---|
| 2,674,648 | 4/1954 | Nicodemus | 310/208 O X |
| 2,757,298 | 7/1956 | Botts et al. | 310/208 |
| 2,763,798 | 9/1956 | Kriss et al. | 310/208 |
| 2,975,088 | 3/1961 | Rossman et al. | 310/208 |
| 3,531,751 | 9/1970 | Sargent | 336/209 |

Primary Examiner—D. F. Duggan
Attorney—Meyer, Tilberry & Body

[57] ABSTRACT

An improved insulated coil for an electrodynamic machine is prepared by wrapping multiple layers of a wide insulative wrapper impregnated with a B-staged resin bonding material around the straight section of the coil, in overlapping contact with a narrow insulative tape impregnated with the identical or a chemically compatible B-staged resin bonding material. The tape is overlapped with the ends of the wide wrapper and the wrapped assembly is then heat and pressure treated to cure the resin impregnate to a permanent, solid set and to form thereby an insulated coil with a continuous, unitary insulative joint between the wrapper and the tape.

16 Claims, 2 Drawing Figures

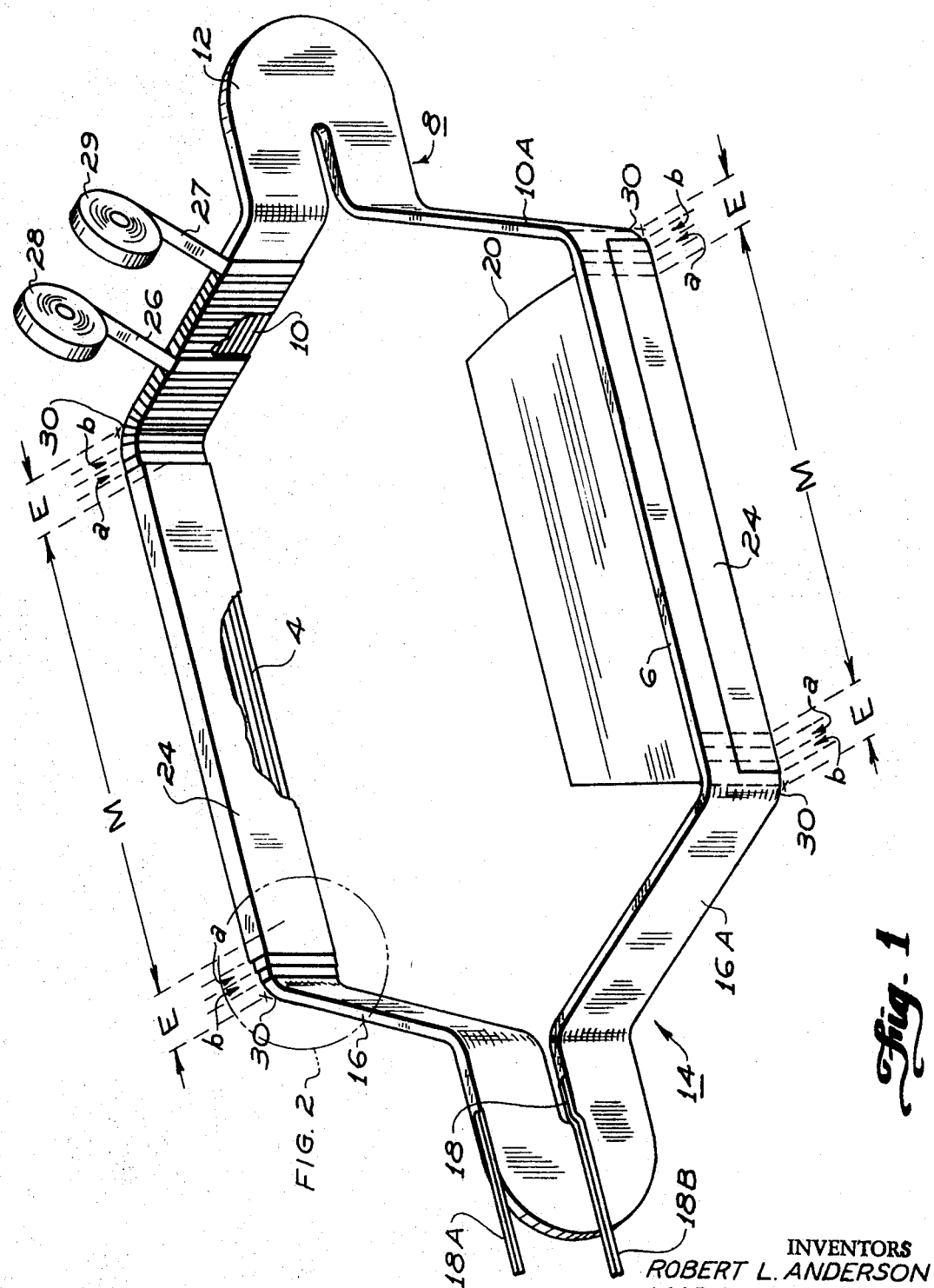

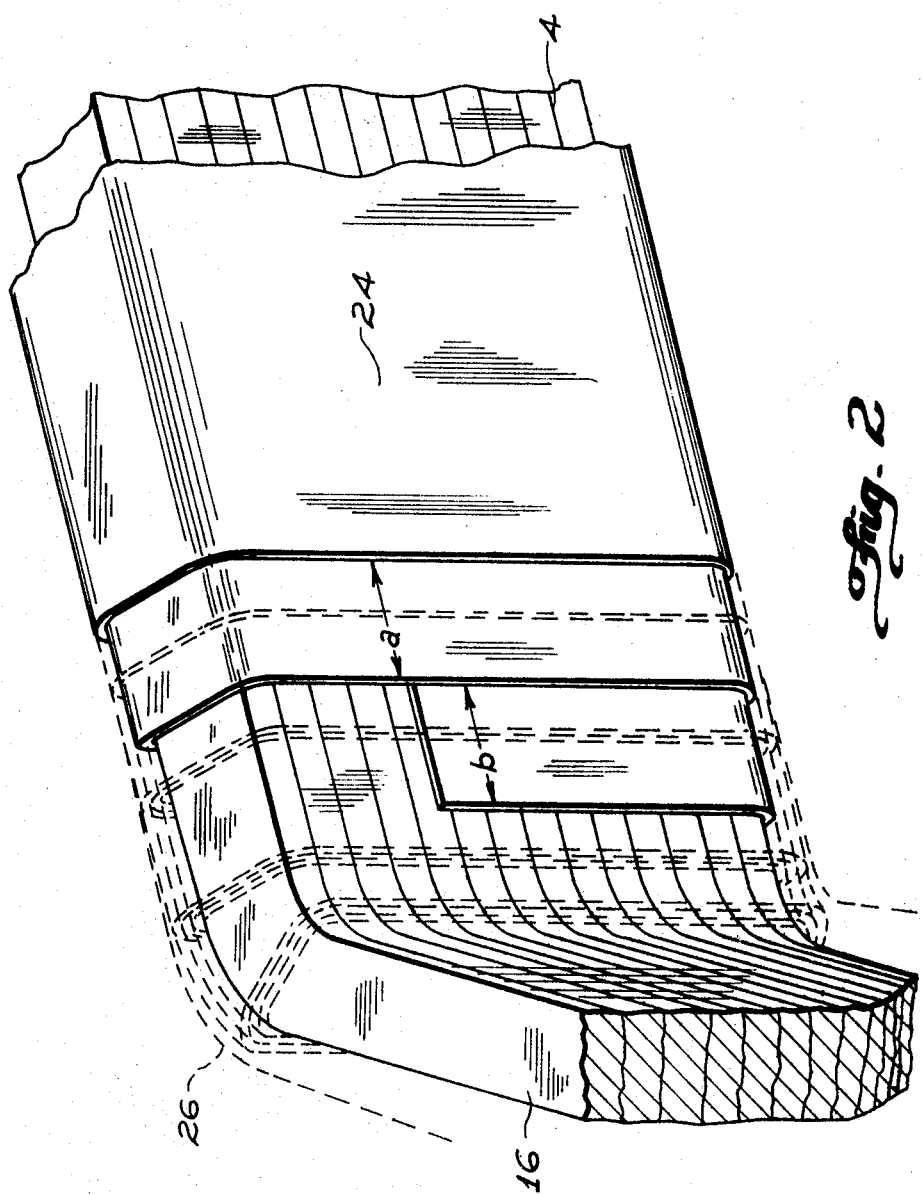

HIGH VOLTAGE INSULATED COIL AND MACHINE UTILIZING THE SAME

This invention is applicable to the art of electrodynamic machines in general and of insulated conductors for electrodynamic machines in particular. More particularly, the invention is applicable to insulated conductive coils for use within electric generators, motors and other equipment.

The invention is particularly applicable to high voltage insulation for motor and generator stator windings, and most particularly to alternating current armature windings and will be described with particular reference thereto although it will be appreciated that it has broader applications, such as for electrodynamic coils and conductors in general. Accordingly, the invention will for convenience be described and illustrated in terms of insulated alternating current armature coil windings, but it is to be understood that the invention is equally applicable to coils in general.

Electric generators and motors contain conductive coil windings relative to which a magnetic field is rotated in order to induce an electric current within the windings, or through which an electric current is passed in order to induce a magnetic field about the coil. Such generators and motors may be referred to generally as "electrodynamic machines." These electrical conductors or coils are usually encased in slots within an iron housing or core coextensive with the magnetic field in order to provide an efficient conductive flux path between the coils. The efficiency, dielectric strength and life of the insulation wrapped around these coils is probably the single greatest factor in determining the reliability and continuity of service of the generator or other equipment.

Stator coils generally comprise a conductor having two straight sections which traverse the length of an imposed magnetic field plus, for reasons explained hereinbelow, a distance beyond each end of the field, this distance being referred to as the "extension." The straight sections are joined at one end in a generally V-shaped return bent section, and converge at the other end in a second, generally V-shaped return bent section to form a pair of parallel conductors.

Insulation of high voltage stator coils is usually accomplished by means of wrapping the coils with insulative mica tape in overlapping helical fashion until the required thickness of insulation is built up on the coil. The usual sizes of tape come in three-fourths, 1, and 1 and ¼-inch widths and it is the usual practice to overlap each turn of tape over one-half the width of the preceeding turn. This overlapping technique results in two thicknesses of tape for each effective turn of insulation. The tape winding method has been generally used for about 40 years. Prior to that time, it was common practice to insulate the straight section of the coil (the straight section of a stator coil in a modern machine typically measures between about 2 feet to about 6 feet in length, although it may be either shorter or longer) with a wide insulative wrapper, usually a mica insulative wrapper. The mica wrapper comprised wide sheets of fabricated mica backed with thin paper and bonded together with shellac. The insulation wrapper was applied to the straight parts of the coils in overlapping fashion by means of a machine which heated and rolled the wrapper onto the coils. The end turns or return bent sections were then insulated with multiple layers of varnished cloth tape. The problem with this technique however, was that electric breakdown was experienced at the joint between the wide sheets of mica wrapper on the straight parts of the coil and the tape on the return bent portions of the coil. The joint occurs at the portion of the coil where the straight section turns into the return bent section. It is for this reason that the straight section of the coil has an extension which projects beyond the iron core or housing so that the joint is removed a distance, (defined as the extension) from the iron core or housing, to reduce the electrical stress on the insulation at the joint. Typical extensions are 2½ inches, 4½ inches or a suitable distance up to about 6 inches in length.

Improvements made to the insulative wrapping materials by replacing the varnish, shellac, paper, etc. with more modern materials generally increased the efficiency of this type of wrapper-tape insulation. However, by the early 1930's, as machines became larger and the length of the straight section of the coil increased, weakening of the joint between wrapper and tape by vibration and thermal expansion and contraction of the stator, and a general lower dielectric strength at the joint caused frequent dielectric breakdown at this point. Accordingly, in order to eliminate the joint it became common practice in the industry to wrap the entire stator coil with a narrow mica tape so that after a suitable hot press step there would be no junction between a wrapper and tape, but rather a continuous, homogenous, overlapping tape which would provide constant insulation throughout the length of the coil. This practice is standard in the industry, to this day.

It will be appreciated that wrapping the entire straight length section of the stator coil, of which there are numerous coils in a single machine, requires a great deal of hand labor, or the use of tape wrapping machines, as this tape must be applied in carefully controlled overlapping relationship to insure a continuous, uniform covering of insulative material of a sufficient dielectric strength.

In addition to the labor and time involved in winding the overlapping tape, it will be appreciated that the overlapping required increases the thickness of the insulation since a single, overlapping turn involves two layers of tape. Aside from the increased insulator cost, the increased thickness of insulation requires increased slot sizes in the iron core which results in a general increase in equipment size for a given rating or output requirement. This is because thicker insulation requires larger slots in the iron core to receive a given size coil thus reducing iron content, and consequently the magnetic flux, per volume of iron core.

Insulative tapes currently in use are generally mica tapes of at least 50 percent mica content, in some cases impregnated with a partially cured resin bonding material, usually an epoxy or a polyester resin, which can be permanently set by heating after the tape is wrapped around the stator coil. Alternatively, the insulated coil may be impregnated with a liquid filling resin introduced by vacuum-pressure impregnation, then heat cured. The mica tape is usually followed by a finishing tape wrapping which is usually, but not necessarily, a glass tape. After the heat curing step, the coil may be varnish-dipped and baked in a finishing operation.

The present invention contemplates a new and improved insulated coil, and new and improved electrodynamic machines employing said coil, which overcomes the above-mentioned shortcomings of the prior art and provides a more efficient and economical electrodynamic machine.

The insulated coil of the invention has a total thickness of insulative wrapping which is less than the thickness of the prior art wrapping of equivalent dielectric strength because of the use of a wide wrapper along the straight portion of the coil instead of overlapping tape, with resultant reductions in machine core slot size for a given rating.

In accordance with the present invention there is provided an insulated coil for an electrodynamic machine, which coil has an insulative wrapping comprising a wide insulative wrapper and a narrow insulative tape, both of which are impregnated with a cureable resin bonding material whereby the wrapper and tape may be cured into a unitary insulative covering throughout, including the joint therebetween.

In one aspect of the invention, there is provided an insulated coil for an electrodynamic machine, with the coil insulative wrapping comprising (1) a wide wrapper insulative material bonded with a cured B-staged resin and wide enough to cover in a single turn of wrapping at least a substantial segment of the straight portion of a coil, which wrapper is applied in multiple layers by successive follow-on-turns and, (2) an insulative tape in narrow widths suitable to apply in overlapping layers to the return bent portions of the coil and impregnated with the identical or a chemically compatible cured B-staged resin.

While it is preferred to cover the entire straight length of the coil with multiple turns of a single width of wide wrapper, if the straight section of the coil is longer than the width of the available wide wrapper, the wider wrapper may be applied in two or three or more successive adjacent widths to cover the entire straight length of the coil with a wrapper of width one-half, one-third, etc. of the straight section.

Alternatively, and preferably, a too-narrow wrapper can be applied lengthwise, using two or more lengths of wrapper to achieve the required number of follow-on turns.

In accordance with another limited aspect of the invention, there is provided an insulated coil whose insulation comprises the cured product of a wide insulative wrapper and a narrow insulative tape impregnated with identical or with chemically compatible resins which are B-staged. By "B-staged" is meant resins which have been partially cured to a flexible, non-liquid state but not finish cured to a hard, final thermoset, and which will harden and permanently thermoset under finish or final curing. The term B-staged is commonly used in the art and will be used in this specification and claims as defined above. Upon finish curing, the joint between the wrapper and the tape is chemically bonded into a unitary joint having a dielectric strength at least as great as the dielectric strength of the insulative wrapper on the straight portion of the coil. The insulative wrapping of the invention is applied in the form of material impregnated with B-staged resins, and then finish cured into a thermoset, hard, infusible material.

The principal object of the invention is to provide an electrodynamic machine containing coils insulated with a combination of B-staged resin impregnated wide wrapper and tape which has been finish cured to comprise a total thickness of insulative wrapping which is less than the thickness of prior art wrappings of equivalent rating, which provides a unitary, dielectric joint between wide wrapper and tape and which may be applied to the coils in an efficient and economical manner.

Other objects of the invention will become apparent from the following description and the accompanying drawings. The invention takes physical form in certain parts and arrangement of parts, a preferred embodiment of which is described in detail in this specification and illustrated in the accompanying drawings which form a part hereof and wherein:

FIG. 1 is a schematic perspective view of an alternating current armature coil showing the insulative wrapping partially applied.

FIG. 2 is an enlarged section of the joint portion of the coil of FIG. 1.

Stator coils, as aforesaid, have straight sections which may usually, but not necessarily, be between about 2 and 6 feet in length. A wide insulative wrapper in multiple layers is advantageously employed in order to cover this straight section without joints in the insulative wrapping and with a minimum of time and labor. Referring now to FIG. 1, a typical stator coil is shown as having straight sections 4 and 6, respectively. The stator coil shown is one of a plurality of coils which are inserted into slots in an iron core comprised of laminated sheets of iron. The length of the iron core and of the imposed magnetic field extends the distance M shown in the drawing. The extensions, the distance which the straight sections of the coil extend beyond the magnetic field and iron core is shown by the distances E. A generally V-shaped return bent portion generally designated 8 consists of short sections 10 and 10A and a knuckle section 12. A second return bent section 14 consists similarly of two short sections 16 and 16A which merge into a knuckle section 18 to form coil leads 18A and 18B.

An insulative wide wrapper 20 is depicted schematically and is shown as having a halfwrap taken around straight section 6. Sufficient turns of the wrapping material are taken around the stator straight section 6 to provide the requisite thickness of insulation. Straight section 4 is shown with a partially cutaway view of the completed insulative wrapping 24 in place. Wrapper 20 is preferably equivalent in width to the length of straight section 6 which is to be insulated since this does away with joints along the straight section of the coil.

Reference is now made to FIG. 2, which shows an enlarged section of the wrapping at the end of wide wrapper 20, and which is typical of the four corners where straight sections 4 and 6 meet return bent sections 8 and 14. It is seen that wrapping 20 is tapered at its edges so that the width of the layers of wrapper around section 4 diminishes in going from the end of the straight section to the end of the wrapper. A first width $a$ and a second width $b$ of diminished width of wrapper turns are shown, it being understood that there may be more than two such layers of diminished width of wrapper.

Return bent portions 8 and 14 are wrapped with an insulative tape 26 shown schematically as being supplied from tape roll 28.

It is essential to the practice of the invention that insulative tape 28 and insulative wrapper 20 be impregnated with the same or with chemically compatible B-staged bonding materials. The reason for this is that when the wrapping is cured to a permanent set, the wrapper and the tape must fuse together into a unitary joint. By chemically compatible resins are meant resins which will form such a unitary joint upon attaining their final set. If a unitary joint is not attained the joint will be subject to cracking or separating due to thermal expansion and contraction of the stator, and/or vibration and will not have sufficient dielectric strength.

The return bent portions are overwrapped with insulative tape 26 as shown with respect to return bent portion 8. The layer of taping is commenced at or near width $b$ (as best shown in FIG. 2) of diminished numbers of wrappers and continues to advance on to the unwrapped section of the bent portion of the coil. A second layer is commenced at or near width $a$, and so on.

The overlapping relationship of insulative tape with the tapered ends of insulative wrapper is best shown in FIG. 2 wherein tape 26 is shown in dotted lines as being applied in an increasing number of layers over width $a$ and width $b$ then on to the unwrapped portions of straight section 4 and return bent short section 16.

By thus overlapping the tape and the wide wrapper, the joint is formed at the critical corners 30 which, when the B-staged resin bonding material is finish-cured under the heat treatment which is applied subsequent to the wrapping operation, forms a chemically bonded unitary joint which in testing has shown a dielectric strength usually greater than that of the insulative wrapping 24.

In a test of the wrapping method and material of the invention, a 36-inch wide B-staged epoxy resin-impregnated mica paper was applied to a conductive bar, with 10 and ½ overlaying turns being taken around the bar. The bars were finished with 4 mil glass tape and hot pressed 1 hour at 425° F., and then the bars were dipped in varnish and given a 2 hour post bake. The bars were tested at room temperature to failure using a 1 minute step test with the following result.

DIELECTRIC STRENGTH TEST-RESIN IMPREGNATED WRAPPER

| | |
|---|---|
| Single wall average thickness of insulation | .092 inch |
| Break down voltage | 49.8 Kilovolts |
| Break down stress of insulation | 541 volts/mil |

The feasibility of using a cured B-staged resin-impregnated wide width wrapper is shown by the foregoing since the breakdown volts per mil of the wide wrapper test insulation is higher than the 400 volt per mil break down stress attained with an equivalent thickness of narrow tape insulation. In removing the insulation from the test bars the individual wrapper layers were fused together into a uniform, homogenous insulator layer.

In order to test the dielectric strength of the joint between wrapper and tape, test bars were wrapped with a B-staged wrapper 18 inches wide. A tapered joint section was completed with a B-staged resin impregnated tape. The tapered joint between the tape and the wrapper was approximately 2½ inches long. The test bar was hot press treated to cure and finished as above. The joints so obtained were tested with simulated 2½ inches extension and 4½ inches extension. The results of the test were as follows.

DIELECTRIC STRENGTH TEST-TAPER JOINT
BETWEEN WRAPPER AND TAPE

|  | 2½ inches Ext. | 4½ inches Ext. |
| --- | --- | --- |
| Single Wall Average Thickness of Insulation | .090 inch | .089 inch |
| Break down voltage | 53 kilovolts | 55 kilovolts |
| Break down Stress of Insulation | 590 volts/mil | 620 volts/mil |

It is seen that the dielectric break down strength of the tape wrapper joint is similarly higher than the 400 volts per mil usually obtained by the conventional taped insulation.

While the entire short and knuckle portions of the return bent coil are wrapped with insulative tape, B-staged cureable resin-impregnated tape 26 is preferably not used for the entire return bent section. Upon final curing, the B-staged cureable resin tape permanently sets into a hard, solid layer. This may be disadvantageous at the knuckle ends 12 and 18, which are subject to being distorted during subsequent installation of the coil into the iron core of the machine.

Therefore, it is advantageous to employ the B-staged cureable resin impregnated tape only at the joint between wrapper and tape and for a distance along short sections 10, 10A and 16, 16A. Prior to reaching knuckle sections 12 or 18, wrapping with B-staged cureable resin impregnated tape 26 is discontinued and fully cured tape 27, schematically shown as being applied from roll 29, is applied instead. Tape 27, being fully cured, will not set up into a hard, relatively inflexible covering but will retain its flexibility so that it can sustain the deformation which knuckles 12 and 18 will undergo during installation.

The joint between tape 26 and tape 27 is sufficiently beyond the end of the imposed magnetic field and the iron core so that it is subjected to a lower electrical stress than is the joint between tape 26 and wrapping 24.

If the knuckles are not subject to distortion during subsequent operations and installation, then the B-staged cureable resin impregnated tape may be used along the entire return bent sections.

While any suitable B-staged mica-resin material may be used in accordance with the invention, successful results have been attained with B-staged Mica Mat GE 77904, manufactured by the General Electric Company, and with B-staged Cogemica Type 630 manufactured by Cogebi, a Belgian company.

While a specific embodiment of the invention has been described with reference to a full coil, i.e., to a coil which has the general rectangular or diamond shape illustrated in FIG. 1, the invention is equally applicable to half-coils which have the general configuration which the coil of FIG. 1 would have if it were bisected along a line running through the center of knuckles 12 and 18. A half coil has not of course, the knuckle turns that a full coil has and accordingly, this is another instance where B-staged, resin-impregnated tape may be used along the entire length of the return bent section.

Insulated coils containing variations and modifications which fall within the spirit and scope of the invention will occur to those skilled in the art upon reading and understanding the foregoing specification. It is intended to include all such variations and modifications within the following claims or the equivalents thereof.

What is claimed is:

1. An insulated coil for an electrodynamic machine, said coil comprising one or more straight sections and one or more return bent sections,
one or more turns of insulative wrapping on said coil, a portion of said wrapping being on said straight sections and comprising the finish cured product of a B-staged resin impregnated wrapper of a width sufficient to cover at least a substantial segment of the entire length of said straight section of said coil, and a portion of said wrapping being on said return bent sections and comprising the finish cured product of a B-staged resin-impregnated tape which resin is chemically compatible with said wrapper resin, said tape being contiguous with said wrapper.

2. The coil of claim 1 wherein said wrapper is of a width sufficient to cover substantially the entire length of said straight section of said coil.

3. The coil of claim 1 wherein said wrapper is of a width sufficient to cover at least about one-third of the entire length of said straight section.

4. An improved electrodynamic machine, the improvement comprising the coils of claim 1 contained within said machine.

5. The coil of claim 2 wherein said wrapper B-staged resin and said tape B-staged resin are identical.

6. The coil of claim 2 wherein said B-staged resins are selected from the class of epoxy resins, polyester resins and mixtures thereof.

7. The coil of claim 2 wherein said wrapper and said tape contain mica as an insulating medium.

8. The coil of claim 7 wherein said mica comprises at least 50 percent by weight of said wrapper and at least 50 percent by weight of said tape.

9. The coil of claim 2 wherein said return bent portion of said coil includes a knuckle portion, and said knuckle portion has wrapped along at least a portion of its length a fully cured tape which is contiguous to said B-staged resin impregnated tape.

10. The coil of claim 2 wherein said wrapper is telescoped at the edges thereof so that successive widths of diminishing numbers of layers of wrapper appear at each end thereof, and said tape is in overlapping relationship to said telescoped ends of said wrapper.

11. An electrodynamic machine having one or more insulated coils contained therein, each of said coils comprising one or more straight sections and one or more return-bent sections, an insulative wrapping on said coil, said wrapping comprising the finish cured product of one or more turns of B-staged resin impregnated wrapper of a width sufficient to substantially cover the entire length of said straight section of said coil, and one or more turns of the finish cured product of B-staged resin impregnated tape wrapped around a portion at least of said return-bent portion, said wrapper and said tape being in overlapping relationship at their respective edges, said wrapper and tape resins being chemically compatible, one with the other.

12. The machine of claim 11 wherein the B-staged resins of said wrapper and said tape are identical resins.

13. The machine of claim 11 wherein the cured-resin compounds are selected from the class consisting of epoxy, polyester, and mixtures thereof.

14. The machine of claim 11 further including layers of finishing tape over said wrapping.

15. The machine of claim 14 further including a varnished coating baked onto said layers of finishing tape.

16. The machine of claim 11 wherein said return bent sections have knuckle portions and said knuckle portions have wrapped along at least a portion of their length a fully cured tape which is contiguous to said B-staged resin impregnated tape.

* * * * *